United States Patent
Kozuka et al.

(10) Patent No.: US 7,226,882 B2
(45) Date of Patent: Jun. 5, 2007

(54) DIELECTRIC MATERIAL AND METHOD OF PRODUCING THE SAME

(75) Inventors: Hisashi Kozuka, Bisai (JP); Yuji Yasunishi, Arlington Heights, IL (US); Kiyoshi Matsuda, Ise (JP)

(73) Assignee: NGK Spark Plug Co., Ltd., Aichi (JP)

( * ) Notice: Subject to any disclaimer, the term of this patent is extended or adjusted under 35 U.S.C. 154(b) by 181 days.

(21) Appl. No.: 10/862,457

(22) Filed: Jun. 8, 2004

(65) Prior Publication Data

US 2006/0035094 A1 Feb. 16, 2006

(30) Foreign Application Priority Data

Jun. 11, 2003 (JP) ............ P. 2003-167047
Apr. 23, 2004 (JP) ............ P. 2004-128922

(51) Int. Cl.
*C04B 35/468* (2006.01)
(52) U.S. Cl. ..................................... 501/139
(58) Field of Classification Search ................ 501/139
See application file for complete search history.

(56) References Cited

U.S. PATENT DOCUMENTS

| 5,264,403 | A | 11/1993 | Abe et al. |
| 5,292,694 | A | 3/1994 | Abe et al. |
| 5,304,521 | A | 4/1994 | Abe et al. |
| 5,350,721 | A | 9/1994 | Abe et al. |
| 5,458,981 | A | 10/1995 | Abe et al. |
| 5,479,140 | A | 12/1995 | Abe et al. |
| 5,485,132 | A | 1/1996 | Abe et al. |
| 5,488,019 | A | 1/1996 | Abe et al. |
| 5,493,262 | A | 2/1996 | Abe et al. |
| 6,458,734 | B1 * | 10/2002 | Sugimoto et al. ........... 501/139 |

FOREIGN PATENT DOCUMENTS

| JP | 5-319920 A | 12/1993 |
| JP | 5-319922 A | 12/1993 |
| JP | 6-76627 | * 3/1994 |
| JP | 6-116023 A | 4/1994 |

* cited by examiner

*Primary Examiner*—Karl Group
(74) *Attorney, Agent, or Firm*—Sughrue Mion, PLLC

(57) ABSTRACT

A dielectric material comprising: a composition represented by $aBaO \cdot bTiO_2 \cdot cREO_{3/2} \cdot dBiO_{3/2}$, wherein a, b, c and d each independently represent a molar ratio satisfying the following requirements: $a+b+c+d=1$, $0.09 \leq a \leq 0.16$, $0.54 \leq b \leq 0.62$, $0.20 \leq c \leq 0.34$ and $0 \leq d \leq 0.10$; and RE represents a rare earth metal; and from 5 to 50 parts by mass, per 100 parts by mass of the composition, of a glass containing a component represented by $kBaO \cdot lZnO \cdot mB_2O_3 \cdot nSiO_2$, wherein k, l, m and n each independently represent a composition percentage satisfying the following requirements: $k+l+m+n=100$, $25 \leq k \leq 55$, $5 \leq l \leq 30$, $15 \leq m \leq 35$ and $5 \leq n \leq 30$.

10 Claims, 1 Drawing Sheet

DIELECTRIC MATERIAL AND METHOD OF PRODUCING THE SAME

FIELD OF THE INVENTION

This invention relates to a dielectric material and a method of producing the same. More specifically, it relates a dielectric material which contains a specific glass, can be sintered simultaneously with a conductor having a high electric conductivity such as silver or copper and has a high relative dielectric constant and in which a lowering ratio in unloaded Q value (hereinafter sometimes merely called "Q value") caused by the glass contained therein is regulated, and a method of producing the same.

BACKGROUND OF THE INVENTION

With the recent increases in communication intelligence data, various communication systems have been rapidly evolving with the use of microwave and millimeter-wave regions such as automobile communications, satellite communications and satellite broadcastings and, in its turns, there have been developed various dielectric materials. From the standpoint of production cost, there have been developed dielectric materials in which metallic materials (for example, silver, copper and so on) having high electric conductivity and low cost are usable as conductors. These materials are used in electronic parts such as resonators and LC filters (see, for example, JP-A-5-319920, JP-A-5-319922 and JP-A-6-116023).

SUMMARY OF THE INVENTION

It is required that these dielectric materials satisfy the following three requirements simultaneously: (1) having a large relative dielectric constant ($\epsilon_r$); (2) having a high Q value; and (3) having a small absolute value of temperature coefficient of resonance frequency ($\tau_f$). In dielectric ceramics employed in the microwave and millimeter-wave regions, however, dielectric characteristics including $\epsilon_r$ tend to worsen as the employed frequency is elevated.

To sinter at low temperatures, there are disclosed techniques of adding, for example, glass as a sinter aid. However, dielectric characteristics (in particular, Q value) tend to worsen with an increase in the glass content. In the case where the glass content is excessively small, on the other hand, sintering at a low temperature becomes difficult. Accordingly, there have been required dielectric ceramics in which lowering in Q value depending on glass content is regulated while sustaining a proper balance among the glass content and other dielectric characteristics such as $\epsilon_r$ and $\tau_f$ and which can be obtained by low temperature-sintering.

To deal with downsizing in electronic parts in which these dielectric materials are employed, it is needed to control dielectric characteristics, in particular, $\epsilon_r$ and $\tau_f$. Thus, there have been required dielectric materials these factors of which can be easily controlled.

To solve the above-described problems, the invention aims at providing a dielectric material which contains a specific glass, can be sintered simultaneously with a conductor having a high electric conductivity such as silver or copper and has a high relative dielectric constant and in which lowering in Q value caused by the glass contained therein is regulated, and a method of producing the same.

The invention is as follows.

(1) A dielectric material characterized by containing a composition represented by $aBaO \cdot bTiO_2 \cdot cREO_{3/2} \cdot dBiO_{3/2}$ (wherein a, b, c and d represent each a molar ratio satisfying the following requirements: $a+b+c+d=1$, $0.09 \leq a \leq 0.16$, $0.54 \leq b \leq 0.62$, $0.20 \leq c \leq 0.34$ and $0 \leq d \leq 0.10$; and RE represents a rare earth metal) and from 5 to 50 parts by mass (parts by weight), per 100 parts by mass of the composition, of a $BaO \cdot ZnO \cdot B_2O_3 \cdot SiO_2$-based glass represented by $kBaO \cdot lZnO \cdot mB_2O_3 \cdot nSiO_2$ (wherein k, l, m and n represent each a composition percentage satisfying the following requirements: $k+l+m+n=100$ (% by mass), $25 \leq k \leq 55$, $5 \leq l \leq 30$, $15 \leq m \leq 35$ and $5 \leq n \leq 30$).

(2) A dielectric material as described in the above (1), which has a relative dielectric constant of 40 or higher.

(3) A dielectric material as described in the above (1) or (2), wherein the lowering ratio of the product of the unloaded Q value and the resonance frequency at the measurement point of the unloaded Q value in the case of using 40 parts by mass of the $BaO \cdot ZnO \cdot B_2O_3 \cdot SiO_2$-based glass to the product of the unloaded Q value and the resonance frequency at the measurement point of the unloaded Q value in the case of using 20 parts by mass of the $BaO \cdot ZnO \cdot B_2O_3 \cdot SiO_2$-based glass is 25% or less.

(4) A dielectric material as described in any of the above (1) to (3), which further contains Al and/or Mn and the content of Al in terms of $Al_2O_3$ is 1.5 parts by mass or less per 100 parts by mass of the composition and the content of Mn in terms of MnO is 3.0 parts by mass or less per 100 parts by mass of the composition.

(5) A method of producing a dielectric material characterized by comprising mixing a composition represented by $aBaO \cdot bTiO_2 \cdot cREO_{3/2} \cdot dBiO_{3/2}$ (wherein a, b, c and d represent each a molar ratio satisfying the following requirements: $a+b+c+d=1$, $0.09 \leq a \leq 0.16$, $0.54 \leq b \leq 0.62$, $0.20 \leq c \leq 0.34$ and $0 \leq d \leq 0.10$; and RE represents a rare earth metal) and from 5 to 50 parts by mass, per 100 parts by mass of the composition, of a $BaO \cdot ZnO \cdot B_2O_3 \cdot SiO_2$-based glass represented by $kBaO \cdot lZnO \cdot mB_2O_3 \cdot nSiO_2$ (wherein k, l, m and n represent each a composition percentage satisfying the following requirements: $k+l+m+n=100$ (% by mass), $25 \leq k \leq 55$, $5 \leq l \leq 30$, $15 \leq m \leq 35$ and $5 \leq n \leq 30$), and then sintering at 850 to 1050° C.

(6) A method of producing a dielectric material as described in the above(5),wherein at least one of an Al component and an Mn component is added so as to give an Al content in terms of $Al_2O_3$ of 1.5 parts by mass or less per 100 parts by mass of the composition and an Mn content in terms of MnO of 3.0 parts by mass or less per 100 parts by mass of the composition.

(7) A method of producing a dielectric material as described in the above (5) or (6), wherein the relative dielectric constant and the temperature coefficient of the resonance frequency are controlled depending on the content of the $BaO \cdot ZnO \cdot B_2O_3 \cdot SiO_2$-based glass.

The dielectric material according to the invention can be sintered simultaneously with a conductor having a high electric conductivity such as silver or copper and has a high $\epsilon_r$ and lowering in its Q value caused by the glass contained therein is regulated. Since lowering in its Q value caused by the glass contained therein is regulated, it can contain a larger amount of the glass and thus can be sintered at a lower temperature than in the existing cases. Since the dielectric characteristics, in particular, $\epsilon_r$ and $\tau_f$ can be controlled depending on the glass content, it can be widely usable in the fields of various electronic parts employed in the microwave and millimeter-wave regions.

In the case where the dielectric material has a relative dielectric constant of 40 or higher, it can be widely usable in the fields of various electronic parts employed in the microwave and millimeter-wave regions.

In the case where a glass is contained in a specific amount so that the lowering ratio in f·Q is 25% or less, the glass content can be increased and, therefore, sintering can be performed at a lower temperature.

In the case of containing Al, a material having a desired $\tau_f$ can be obtained. In the case of containing Mn, the Q value can be further elevated.

According to the method of producing a dielectric material of the invention, it is possible to easily produce a dielectric material which can be sintered simultaneously with a conductor having a high electric conductivity such as silver or copper and has a high relative dielectric constant and in which lowering in the Q value caused by the glass contained therein is regulated.

In the case of containing an Al component, $\tau_f$ can be controlled. In the case of containing an Mn component, the Q value can be further elevated.

Since the dielectric characteristics, in particular, $\epsilon_r$ and $\tau_f$ can be controlled depending on the glass content, it is possible to easily produce a dielectric material which can be widely usable in the fields of various electronic parts employed in the microwave and millimeter-wave regions.

Use of the material according to the invention enables downsizing of parts of, for example, LC filters. FIG. 1 shows the appearance of an example of LC filters using the material according to the invention.

DETAILED DESCRIPTION OF THE INVENTION

Figure 1:
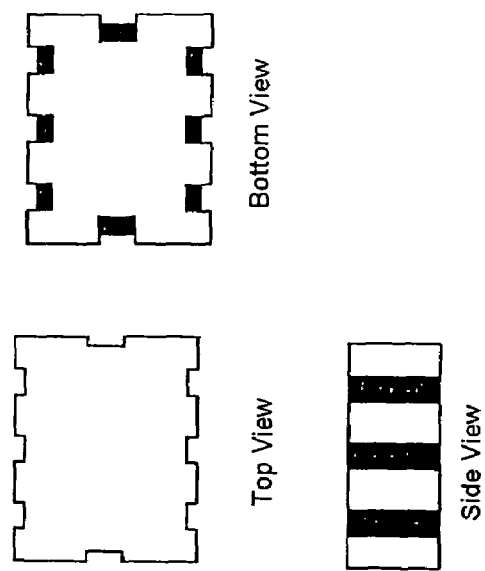
FIG. 1 shows the appearance of an example of LC filters using the material according to the invention.
Figure 1:
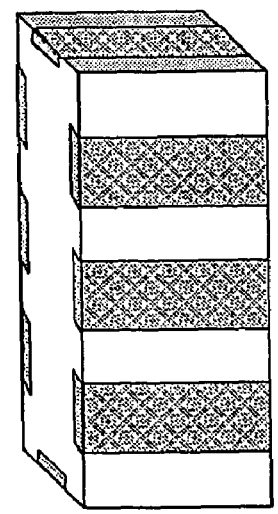

Now, the invention will be illustrated in greater detail.

In the above-described composition represented by $aBaO \cdot bTiO_2 \cdot cREO_{3/2} \cdot dBiO_{3/2}$ (wherein a, b, c and d represent each a molar ratio and a+b+c+d=1) (hereinafter sometimes referred to simply as "the composition") in the dielectric material according to the invention, the above-described "a" (i.e., the molar ratio of "Ba") is specified as follows: $0.09 \leq a \leq 0.16$, preferably $0.10 \leq a \leq 0.15$ and still preferably $0.11 \leq a \leq 0.15$. In the case where a is less than 0.09, the sintering properties of the resulting dielectric material are deteriorated. In the case where a exceeds 0.16, on the other hand, $\tau_f$ of the resulting dielectric material shifts toward the positive side.

The above-described "b" (i.e., the molar ratio of "Ti") is specified as follows: $0.54 \leq b \leq 0.62$, preferably $0.55 \leq b \leq 0.61$ and still preferably $0.56 \leq b \leq 0.59$. In the case where b is less than 0.54, the Q value of the resulting dielectric material is lowered and $\tau_f$ thereof shifts toward the positive side. In the case where b exceeds 0.62, on the other hand, the Q value of the resulting dielectric material is lowered.

The above-described "c" (i.e., the molar ratio of "RE") is specified as follows: $0.20 \leq c \leq 0.34$, preferably $0.24 \leq c \leq 0.33$ and still preferably $0.24 \leq c \leq 0.32$. In the case where c is less than 0.20, the Q value of the resulting dielectric material is lowered. In the case where c exceeds 0.34, on the other hand, the sintering properties of the resulting dielectric material tend to worsen.

The above-described "d" (i.e., the molar ratio of "Bi") is specified as follows: $0 \leq d \leq 0.10$, preferably $0.02 \leq d \leq 0.08$ and still preferably $0.04 \leq d \leq 0.07$. In the case where d exceeds 0.10, $\epsilon_r$ of the resulting dielectric material is lowered. Even in the case where d is 0, a dielectric material having a sufficient $\epsilon_r$ can be obtained.

The above-described "RE" is a rare earth metal and examples thereof include Nd, Sm, Gd, La, Ce, Pr and so on. Among all, it is preferable that the rare earth metal is Nd, Sm or Gd. In such a case, the absolute value of $\tau_f$ can be approached to 0 while sustaining $\epsilon_r$ and the Q value each at a high level.

The above-described "$BaO \cdot ZnO \cdot B_2O_3 \cdot SiO_2$-based glass" represented by the above-described "$kBaO \cdot lZnO \cdot mB_2O_3 \cdot nSiO_2$ (wherein k+l+m+n=100 (% by mass))" (hereinafter sometimes referred to simply as "the glass") is contained to obtain a dense sintered product by sintering at a low temperature. Owing to the presence of this glass, moreover, a dielectric material having $\epsilon_r$ of 40 or higher can be obtained by sintering at a low temperature of about 900° C.

The above-described "k" (i.e., the composition percentage of "BaO") is specified as follows: $25 \leq k \leq 55$, preferably $20 \leq k \leq 50$ and still preferably $30 \leq k \leq 45$. In the case where k is less than 25% by mass, the sintering temperature is elevated. In the case where k exceeds 55% by mass, on the other hand, the Q value is lowered.

The above-described "l" (i.e., the composition percentage of "ZnO") is specified as follows: $5 \leq l \leq 30$, preferably $7 \leq l \leq 25$ and still preferably $10 \leq l \leq 20$. In the case where l is less than 5% by mass or exceeds 30% by mass, the sintering temperature is elevated.

The above-described "m" (i.e., the composition percentage of "$B_2O_3$") is specified as follows: $15 \leq m \leq 35$, preferably $17 \leq m \leq 33$ and still preferably $20 \leq m \leq 30$. In the case where m is less than 15% by mass, the sintering temperature is elevated. In the case where m exceeds 35% by mass, on the other hand, the Q value is lowered.

The above-described "n" (i.e., the composition percentage of "$SiO_2$") is specified as follows: $5 \leq n \leq 30$, preferably $7 \leq n \leq 25$ and still preferably $10 \leq n \leq 20$ In the case where n is less than 5% by mass, $\epsilon_r$ is lowered. In the case where n exceeds 30% by mass, on the other hand, the sintering temperature is elevated.

Referring the amount of the whole glass as to 100% by mass, it is preferable that the sum of the composition percentages of BaO, ZnO, $B_2O_3$ and $SiO_2$ is 50% by mass or more, still preferably 60% by mass or more. In the case where the sum of the composition percentages is 50% by mass or more, a dense sintered product can be obtained by sintering at a low temperature.

In addition to BaO, ZnO, $B_2O_3$ and $SiO_2$ as described above, the glass may further contain an oxide of another metal element such as an alkali metal element or an alkaline earth metal element.

It is preferable that this glass is free from PbO. Although the presence of PbO, if any, can promote sintering at a low temperature, it is favorable from the standpoint of environmental protection that the glass is free from PbO.

Per 100 parts by mass of the above-described composition, the content of the glass ranges from 5 to 50 parts by mass, preferably from 5 to 35 parts by mass and still preferably from 7 to 30 parts by mass. In the case where the glass content is less than 5 parts by mass, low temperature-sintering cannot be carried out. In the case where the glass content exceeds 50 parts by mass, on the other hand, the Q value of the resultant dielectric material is lowered.

In the invention, the dielectric characteristics, in particular, $\epsilon_r$ and $\tau_f$ of the resultant dielectric material can be controlled depending on the glass content. Namely, $\epsilon_r$ tends to rise with a decrease in the glass content and lower with an increase in the glass content. On the other hand, the absolute value of $\tau_f$ tends to rise with a decrease in the glass content and lower with an increase in the glass content.

In the invention, furthermore, lowering in the Q value due to the glass contained therein can be regulated. Thus, the glass can be contained in a larger amount and sintering can be carried out at a lower temperature than in the existing cases. More specifically speaking, the lowering ratio of f·Q in the case of using 40 parts by mass of the above-described glass to f·Q in the case of using 20 parts by mass of the glass can be regulated to 25% or less, more particularly 20% or less and still particularly 15% or less.

The dielectric material according to the invention may contain at least one of Al and Mn. That is to say, it may contain Al alone, Mn alone or both of Al and Mn.

As discussed above, $\tau_f$ can be controlled depending on the above-described glass content. Further, it can be also controlled depending on the Al content. Therefore, $\tau_f$ can be more minutely controlled by using Al.

Al can be contained in an amount of 1.5 parts by mass or less (usually not less than 0.01 part by mass), in terms of $Al_2O_3$, per 100 parts by mass of the above-described composition. In order to lower the absolute value of if, the content of Al preferably ranges from 0.1 to 1.5 parts by mass, still preferably from 0.2 to 1.5 parts by mass and particularly preferably from 1.0 to 1.5 parts by mass. In the case where the content is from 0.01 to 1.5 parts by mass, $\tau_f$ can be regulated to 23 ppm/° C. or less. In the case where the content is from 0.1 to 1.5 parts by mass, $\tau_f$ can be regulated to 22 ppm/° C. or less. In the case where the content is from 0.2 to 1.5 parts by mass, $\tau_f$ can be regulated to 20 ppm/° C. or less. In the case where the content is from 1.0 to 1.5 parts by mass, $\tau_f$ can be regulated to 17 ppm/° C. or less.

Owing to the presence of Mn, sintering properties are improved and the Q value can be elevated. In a dielectric material to be used in LC filters or the like, a high Q value is particularly favorable.

Mn can be contained in an amount of 3.0 parts by mass or less (usually not less than 0.01 part by mass), in terms of MnO, per 100 parts by mass of the above-described composition. In order to elevate the Q value, the Mn content preferably ranges from 0.01 to 1.9 parts by mass, still preferably from 0.06 to 1.5 parts by mass and particularly preferably from 0.12 to 1.0 part by mass. In the case where the content is from 0.01 to 1.9 parts by mass, f·Q of 2500 GHz or higher can be obtained. In the case where the content is from 0.06 to 1.5 parts by mass, f·Q of 2700 GHz or higher can be obtained. In the case where the content is from 0.12 to 1.0 part by mass, f·Q of 2800 GHz or higher can be obtained.

Preferable contents of Al and Mn as described above can be selected by combining preferable contents of the individual components.

The method of producing the above-described dielectric material is not particularly restricted. For example, it can be produced by the method of producing the dielectric material according to the invention.

Concerning the above-described composition represented by "$aBaO \cdot bTiO_2 \cdot cREO_{3/2} \cdot dBiO_{3/2}$", the illustrations as described above can be applied each as such.

The method of producing the composition is not particularly restricted. For example, it can be obtained by blending materials containing the defined components in such a manner as to give the defined composition. Examples of the materials include powders of oxides, carbonates and hydroxides of the definite elements, liquids of organic metal compounds containing the definite elements and so on.

Moreover, the composition may be subjected to a heat treatment, if necessary. The heat treatment is carried out preferably at a temperature of from 1000 to 1400° C., still preferably from 1000 to 1200° C. In the case where the heating temperature is from 1000 to 1200° C., a sintered product having an improved density can be obtained. The heating treatment is carried out usually for 0.5 to 5 hours, in particular, 1 to 2 hours.

Concerning the above-described "$BaO \cdot ZnO \cdot B_2O_3 \cdot SiO_2$-based glass" represented by "$kBaO \cdot lZnO \cdot mB_2O_3 \cdot nSiO_2$ (k+l+m+n=100 (% by mass))" as described above, the illustrations as described above can be applied each as such except the content thereof as will be illustrated below.

Per 100 parts by mass of the above-described composition, the content of the glass ranges from 5 to 50 parts by mass, preferably from 5 to 35 parts by mass and still preferably from 7 to 30 parts by mass. In the case where the content thereof is less than 5 parts by mass, low temperature-sintering cannot be carried out. In the case where the content exceeds 50 parts by mass, on the other hand, the Q value of the resultant dielectric material is lowered.

In the invention, the dielectric characteristics, in particular, $\epsilon_r$ and $\tau_f$ of the resultant dielectric material can be controlled depending on the glass content. Namely, $\epsilon_r$ tends to rise with a decrease in the glass content and lower with an increase in the glass content. The absolute value of $\tau_f$ tends to rise with a decrease in the glass content and lower with an increase in the glass content.

In the invention, furthermore, lowering in the Q value due to the glass contained therein can be regulated. Thus, the glass can be contained in a larger amount and sintering can be carried out at a lower temperature than in the existing cases. More specifically speaking, the lowering ratio of f·Q in the case of using 40 parts by mass of the above-described glass to f·Q in the case of using 20 parts by mass of the glass can be regulated to 25% or less, more particularly 20% or less and still particularly 15% or less.

The central particle diameter of the above-described glass preferably ranges from 0.1 to 3.0 μm, still preferably from 0.1 to 2.0 μm and still preferably form 0.1 to 1.5 μm. In the case where the central particle diameter is from 0.1 to 1.5 μm, sintering can be carried out at a lower temperature and a dielectric material having well balanced dielectric characteristics and a high density can be produced.

It is further preferable that the glass has a glass transition temperature of 550° C. or lower, still preferably 500° C. or lower. In the case where the glass transition temperature is 500° C. or lower, low temperature-sintering can be carried out at a smaller glass content. Namely, worsening in the dielectric characteristics can be thus lessened. The glass transition temperature is measured by differential thermal analysis (DTA).

To blend the above-described composition with the glass, use can be made of publicly known mixing procedures without restriction. Furthermore, the obtained mixture is usually molded into a definite shape before sintering. For the molding, use may be also made of publicly known procedures without restriction.

It is preferable that the above-described sintering is made at a temperature of from 850 to 1050° C., still preferably from 850 to 1000° C. and still preferably from 850 to 950° C. In the case where the sintering temperature is from 850 to 1000° C., sintering can be more easily carried out simultaneously with Ag having a low conducting resistance or its alloy such as Ag—Pd or Ag—Pt. At a sintering temperature lower than 930° C., in particular, simultaneous sintering can be still easily carried out with the use of Ag having a lower conducting resistance as an internal conductor. The sintering time is usually from 0.5 to 5 hours.

In this production method, furthermore, it is possible to blend an Al component and/or an Mn component.

The term "Al component" means a component at least containing Al, while the term "Mn component" means a component at least containing Mn. In the case of containing Al and Mn at the same time, use can be made both of an Mn-free Al component and an Al-free Mn component. It is also possible to use an Mn-containing Al component alone or an Al-containing Mn component alone. Moreover, it is possible to use both of these components.

As the Al component, Al compounds, elementary Al and the like may be cited. Among them, examples of the Al compounds include oxides ($Al_2O_3$, complex oxides containing both of Al and Mn, etc.), carbonates containing Al, hydroxides containing Al, organic compounds containing Al and so on. Among them, $Al_2O_3$ is preferred. Although these Al components are not particularly restricted in form, powdery and liquid (organic metal compounds, etc.) substances may be cited. Either one of these Al components or two or more thereof may be used regardless of the type and form.

In the case of using an Al component, its content, in terms of $Al_2O_3$, may be controlled to 1.5 parts by mass or less (usually not less than 0.01 part by mass) per 100 parts by mass of the above-described composition. By controlling the content within this range, $\tau_f$ can be regulated. The Al content, in terms of $Al_2O_3$, can be controlled to 1.5 parts by mass or less (usually not less than 0.01 part by mass) per 100 parts by mass of the above-described composition. In order to regulate the absolute value of $\tau_f$ at a low level, the Al content preferably ranges from 0.1 to 1.5 parts by mass, still preferably from 0.2 to 1.5 parts by mass and particularly preferably from 1.0 to 1.5 parts by mass. As discussed above, it is preferable to control within each range.

As the Mn component, on the other hand, Mn compounds, elementary Mn and the like may be cited. Among them, examples of the Mn compounds include oxides (MnO, complex oxides containing both of Mn and Al, etc.), carbonates containing Mn, hydroxides containing Mn, organic compounds containing Mn and so on. Among them, MnO is preferred. Although these Mn components are not particularly restricted in form, powdery and liquid (organic metal compounds, etc.) substances may be cited. Either one of these Mn components or two or more thereof may be used regardless of the type and form.

In the case of using an Mn component, its content, in terms of MnO, may be controlled to 3.0 parts by mass or less (usually not less than 0.01 part by mass) per 100 parts by mass of the above-described composition. By controlling the content within this range, the Q value can be elevated. The Mn content, in terms of MnO, can be controlled to 3.0 parts by mass or less (usually not less than 0.01 part by mass) per 100 parts by mass of the above-described composition. In order to elevate the Q value, the Mn content preferably ranges from 0.01 to 1.9 parts by mass, still preferably from 0.06 to 1.5 parts by mass and particularly preferably from 0.12 to 1.0 part by mass. As discussed above, it is preferable to control within each range.

In the dielectric material according to the invention and the dielectric material produced by the production method according to the invention, $\epsilon_r$, which is measured as in Examples as will be described hereinafter, can be controlled to 30 or higher, more specifically 40 or higher and still specifically from 50 to 70.

In these dielectric materials, f·Q, which is measured as in Examples as will be described hereinafter, can be controlled to 1500 GHz or more, more specifically 2000 GHz or more and still specifically 2500 GHz or more.

In these dielectric materials, furthermore, the absolute value of $\tau_f$, which is measured as in Examples as will be described hereinafter, can be controlled to 40 ppm/° C. or smaller, more specifically 30 ppm/° C. or smaller and still specifically 20 ppm/° C. or smaller.

In these dielectric materials, moreover, $\epsilon_r$, f·Q and the absolute value of $\tau_f$, each measured as in Examples as will be described hereinafter, can be controlled respectively to 30 or higher, 1500 GHz or more and 40 ppm/° C. or smaller. More specifically, $\epsilon_r$, f·Q and the absolute value of $\tau_f$ can be controlled respectively to 50 to 70, 2000 GHz or more and 25 ppm/° C. or smaller. Still specifically, $\epsilon_r$, f·Q and the absolute value of $\tau_f$ can be controlled respectively to 50 to 70, 2500 GHz or more and 24 ppm/° C. or smaller.

These dielectric materials are usable as various electronic parts to be employed in the microwave and millimeter-wave regions. As examples of the various electronic parts, discrete parts such as resonators, LC devices, LC filters, couplers, duplexers, diplexers, diodes, dielectric antennas and ceramic condensers may be cited. Further examples thereof include substrates such as general-purpose substrates and functional substrates having various functional parts embedded therein (LTCC multi-layered devices, etc.), packages such as MPU and SAW and modules provided at least one member selected from these discrete parts, substrates and packages. These electronic parts are usable in, for example, mobile communication equipments, mobile communication base station equipments, satellite communication equipment, satellite communication base station equipments, satellite broadcasting equipments, wireless LAN equipments and Bluetooth™ equipments.

EXAMPLES

Now, the invention will be described in greater detail by reference to the following Examples.

Examples 1 to 12 and Comparative Example 1

(1) Dielectric Materials (Containing Neither Al nor Mn)

A $BaCO_3$ powder (purity: 99.9%), a $TiO_2$ powder (purity: 99.9%), an $RE_2O_3$ powder (RE: Nd, Sm, Gd, purity: 99.9%) and a $Bi_2O_3$ powder (purity: 99.9%), which were employed as starting materials, were dry-mixed in a mixer for 20 to 30 minutes in such a manner as to give a composition represented by $aBaO \cdot bTiO_2 \cdot cREO_{3/2} \cdot dBiO_{3/2}$ wherein a, b, c and d were each as specified in Table 1. Then the mixture was ground for 4 hours in a vibration ball mill with the use of alumina balls as mill stones.

TABLE 1

| | a | b | c | d | Rare earth metal (RE) |
|---|---|---|---|---|---|
| No. 1 | 0.122 | 0.567 | 0.254 | 0.057 | Nd |
| No. 2 | 0.112 | 0.604 | 0.245 | 0.039 | Nd |
| No. 3 | 0.122 | 0.567 | 0.311 | — | Nd |
| No. 4 | 0.122 | 0.567 | 0.254 | 0.057 | Nd:Sm = 0.6:0.4 |
| No. 5 | | | | | Nd:Sm = 0.2:0.8 |
| No. 6 | | | | | Sm |
| No. 7 | | | | | Nd:Gd = 0.4:0.6 |

Next, the powdery mixture thus obtained was heated at 1100° C. for 2 hours in the atmosphere and then ground in a ball mill. The ground matter thus obtained was blended with a $BaO \cdot ZnO \cdot B_2O_3 \cdot SiO_2$-based glass powder listed in Table 2 and an appropriate amount of an organic binder. After wet-mixing in a ball mill, the resultant mixture was dried by using a freeze-dryer and granulated. The values given in "Glass component" in Table 2 mean the contents of respective components expressed by referring the sum of BaO, ZnO, $B_2O_3$ and $SiO_2$ as to 100% by mass. Table 3 shows the content of the glass powder.

TABLE 2

| | | Component (% by mass) of BaO.ZnO.B$_2$O$_3$.SiO$_2$-based glass | | | | Glass transition temp. (° C.) | Central particle diameter (μm) |
|---|---|---|---|---|---|---|---|
| | | BaO(k) | ZnO(l) | B$_2$O$_3$(m) | SiO$_2$(n) | | |
| Glass type | No. 1 | 40.6 | 16.2 | 27.0 | 16.2 | 444 | 1.1 |
| | No. 2 | 19.2 | 24.2 | 34.2 | 22.4 | 496 | 1.3 |
| | No. 3 | 38.1 | 17.5 | 29.5 | 15.0 | 430 | 1.1 |

Next, the granulated powder thus obtained was molded into columns of 19 mm in diameter and 8 mm in height with a press machine (molding pressure: 98 MPa) and then sintered in the atmosphere at a temperature of 900 to 950° C. for 2 hours to prepare a dielectric material (Examples 1 to 12 and Comparative Example 1).

TABLE 3

| | Composition type | Glass Type | Glass Content (part by mass) | $\epsilon_r$ | f · Q (GHz) | $\tau_f$ (ppm/° C.) | Sintering temp. (° C.) |
|---|---|---|---|---|---|---|---|
| Ex. 1 | No. 1 | No. 1 | 10 | 66.8 | 2579 | 33.9 | 950 |
| Ex. 2 | | | 15 | 60.1 | 2528 | 27.4 | 930 |
| Ex. 3 | | | 20 | 54.3 | 2436 | 23.1 | 900 |
| Ex. 4 | | | 40 | 34.7 | 2292 | 8.6 | 860 |
| Ex. 5 | No. 2 | | 10 | 60.2 | 3068 | 24.5 | 950 |
| Ex. 6 | | | 20 | 51.7 | 2665 | 12.8 | 900 |
| Ex. 7 | | | 40 | 30.4 | 2136 | 3.0 | 880 |
| Ex. 8 | No. 3 | | 20 | 51.2 | 2576 | 35.8 | 900 |
| Ex. 9 | No. 4 | | | 55.2 | 2384 | 21.3 | |
| Ex. 10 | No. 5 | | | 53.1 | 2280 | 10.7 | |
| Ex. 11 | No. 6 | | | 50.3 | 1932 | 7.4 | |
| Ex. 12 | No. 7 | | | 48.9 | 1614 | 15.7 | |
| C. Ex. 1 | No. 1 | No. 2 | 20 | 29.7 | 1432 | 16.8 | 1000 Sintering impossible 950 |

Examples 13 to 29

(2) Dielectric Materials (Containing Al and/or Mn)

A ground matter obtained in the above (1) was blended with a BaO.ZnO.B$_2$O$_3$.SiO$_2$-based glass powder listed in Table 2, an Al$_2$O$_3$ powder (purity: 99.9%) and/or an MnO powder (purity: 99.9%) each in the amount given in Table 4 (based on 100 parts by mass of each composition) and an appropriate amount of an organic binder. After wet-mixing in a ball mill, the resultant mixture was dried by using a freeze-dryer and granulated.

Next, the granulated powder thus obtained was molded into columns of 19 mm in diameter and 8 mm in height with a press machine (molding pressure: 98 MPa) and then sintered in the atmosphere at a temperature of 900 to 950° C. for 2 hours to prepare a dielectric material. In Examples 13 to 27, Al and/or Mn were added to the sample of the above Example 3. In Example 28, Al and Mn were added to the sample of the above Example 4.

TABLE 4

| | | Composition type | Glass Type | Glass Content (parts by mass) | Al$_2$O$_3$ content (parts by mass) | MnO content (parts by mass) | $\epsilon_r$ | f · Q (GHz) | $\tau_f$ (ppm/° C.) | Sintering temp. (° C.) |
|---|---|---|---|---|---|---|---|---|---|---|
| Example | 13 | No. 1 | No. 1 | 20 | 0.05 | — | 54.0 | 2428 | 22.4 | 900 |
| | 14 | | | | 0.1 | | 53.7 | 2437 | 21.8 | |
| | 15 | | | | 0.2 | | 53.4 | 2411 | 19.4 | |
| | 16 | | | | 0.4 | | 52.9 | 2342 | 19.0 | |
| | 17 | | | | 1.2 | | 47.5 | 1604 | 16.5 | |
| | 18 | | | | 2.0 | | 45.1 | 1392 | 17.7 | 950 |
| | 19 | No. 1 | No. 1 | 20 | — | 0.05 | 54.1 | 2561 | 23.5 | 900 |
| | 20 | | | | | 0.1 | 53.3 | 2730 | 24.8 | |
| | 21 | | | | | 0.2 | 51.6 | 2888 | 25.4 | |
| | 22 | | | | | 0.4 | 51.1 | 2872 | 27.0 | |
| | 23 | | | | | 2 | 50.0 | 1916 | 31.7 | |
| | 24 | | | | | 3.5 | 48.5 | 1451 | 34.9 | |
| | 25 | No. 1 | No. 1 | 20 | 0.2 | 0.1 | 53.0 | 2719 | 21.2 | 900 |
| | 26 | | | | 0.4 | 0.1 | 52.1 | 2550 | 19.4 | |
| | 27 | | | | 0.2 | 0.2 | 52.4 | 2685 | 23.7 | |
| | 28 | | | 40 | 0.2 | 0.1 | 32.3 | 2296 | 7.0 | 880 |
| | 29 | No. 1 | No. 3 | 20 | 0.2 | 0.1 | 55.1 | 2679 | 20.8 | 880 |

(3) Evaluation of Dielectric Materials

By the parallel-plate dielectric resonator method, $\epsilon_r$'s, Q values and $\tau_f$'s of the dielectric materials obtained in the above (1) and (2) were measured at a frequency of 1 to 5 GHz (temperature range: 25 to 80° C.). Table 3 shows the results. The Q value is expressed in the product of the Q value at the measurement resonance frequency (f) and the measured value (f·Q).

(4) Effects of Examples

As the results shown in Table 3 indicate, the dielectric material of Comparative Example 1, in which a glass having a small composition percentage of the BaO component was used, could not sintered at 950° C. Thus, it can be understood that this dielectric material could not sintered at a low temperature of 950° C. or lower. Although this dielectric material could be sintered at 1000° C., the sintered product was poor in $\epsilon_r$ and the f·Q value (i.e., $\epsilon_r$: 29.7, $\tau_f$: 16.8 ppm/° C., f·Q: 1432 GHz). Compared to Example 3 wherein the composition (No. 1) employed in this Comparative Example 1 was employed in the same amount and sintered at 900° C., it can be also understood that the sample of Comparative Example 1 was inferior in $\epsilon_r$ and f·Q.

In contrast thereto, the dielectric materials of Examples 1 to 12 could be sintered at a low temperature of 860 to 950° C. and showed $\epsilon_r$'s of from 30.4 to 66.8, f·Q values of from 1614 to 3068 GHz and $\tau_f$'s of from 3.0 to 35.8 ppm/° C. Based on these results, it is clarified that each of the dielectric materials of Examples according to the invention can be sintered at a low temperature, has a high $\epsilon_r$ and is well-balanced in other dielectric characteristics.

In these dielectric materials, $\epsilon_r$ tends to rise with a decrease in the glass content and lower with an increase in the glass content. Further, the absolute value of $\tau_f$ tends to rise with a decrease in the glass content and lower with an increase in the glass content. Namely, it is found out that $\epsilon_r$ and $\tau_f$ can be controlled depending on the glass content.

According to Examples 3 and 4 and Examples 6 and 7, the lowering ratios in f·Q in the case of changing the glass content from 20 parts by mass to 40 parts by mass were respectively 6% and 20%. Thus, it can be understood that lowering in f·Q was regulated in both cases. These results indicate that lowering in f·Q caused by an increase in the glass content can be regulated and thus sintering can be carried out at a lower temperature.

However, the invention is not restricted to the above-described Examples but various changes can be made depending on the purpose and use within the scope of the invention.

As the results shown in Table 4 indicate, the absolute $\tau_f$ values lowered with an increase in the Al content in Examples 13 to 17. That is, $\tau_f$ was 23.1 ppm/° C. in Example 1 but 19.4 ppm/° C. in Example 15, showing a lowering of 16%. In Example 17, $\tau_f$ was 16.5 ppm/° C., showing a considerable lowering of 29%. In Examples 13 to 16, these effects were achieved while sustaining $\epsilon_r$ at a proper level. In Example 18, however, the absolute value of $\tau_f$ was larger than in Example 17, which points out that no effect of lowering $\tau_f$ can be obtained any more even by further adding Al. Accordingly, it can be understood that, in case of adding Al in order to lower the absolute value of $\tau_f$, it is favorable to add Al in an amount less than 1.5 parts by mass to thereby control $\tau_f$.

In Examples 19 to 21, it can be understood that the Q value was elevated with an increase in the Mn content. Namely, f·Q in Example 3 was 2436 GHz, while that in Example 20 was 2730 GHz, showing an increase of 12%. In Example 21, f·Q was 2888 GHz, showing a considerable increase of 19%. Although f·Q was slightly lowered in Example 22 compared with Example 21, an increase of 15% was still observed compared with Example 3. In Examples 19 to 22, in particular, these effects were achieved while sustaining $\epsilon_r$ at a proper level. In Examples 23 and 24, however, f·Q values were lowered, which indicates that there is an upper limit of the Mn content for elevating the Q value. That is to say, it is favorable that, in the case of adding Mn in order to elevate the Q value, the Mn content is appropriately controlled to less than 2.0 parts by mass and the Q value is controlled while taking the proper balance with other dielectric characteristics.

Example 30

A binder, a plasticizer, a dispersant, etc. were added to the dielectric material obtained in Example 25, which had been milled to give a definite particle diameter, and wet-mixed. After defoaming, the obtained mixture was shaped into a green sheet of a definite thickness by the doctor blade method. On the green sheet thus obtained, the BPF conductor pattern was printed by using an Ag paste having controlled contraction behaviors followed by lamination by heat pressing. Then it was cut into a definite size, defoamed and sintered at 900° C. in the atmosphere. A side electrode was constructed by forming a through hole in the green sheet, printing and then sintering together under the above-described sintering conditions. Alternatively, it may be formed by, after once sintering, printing an electrode by using a side printer and then baking/sintering again.

Evaluation

The thus constructed BPF was evaluated by using a network analyzer and it was thus confirmed that the desired filter characteristics had been achieved. By polishing a cross section of the BPF constructed above, it was confirmed that the BPF was free from any problems such as migration or delamination.

The invention is widely usable in the fields of various electronic parts to be employed in the microwave and millimeter-wave regions such as resonators, LC devices, LC filters, couplers and dielectric antennas.

This application is based on Japanese Patent application JP 2003-167047, filed Jun. 11, 2003, and Japanese Patent application JP 2004-128922, filed Apr. 23, 2004, the entire contents of which are hereby incorporated by reference, the same as if set forth at length.

What is claimed is:

1. A dielectric material comprising:
   a composition represented by $aBaO \cdot bTiO_2 \cdot cREO_{3/2} \cdot dBiO_{3/2}$, wherein a, b, c and d each independently represent a molar ratio satisfying the following requirements: a+b+c+d=1, 0.09≦a≦0.16, 0.54≦b≦0.62, 0.20≦c≦0.34 and 0≦d≦0.10; and RE represents a rare earth metal; and
   from 5 to 40 parts by mass, per 100 parts by mass of the composition represented by $aBaO \cdot bTiO_2 \cdot cREO_{3/2} \cdot dBiO_{3/2}$, of a glass containing a component represented by $kBaO \cdot lZnO \cdot mB_2O_3 \cdot nSiO_2$, wherein k, l, m and n each independently represent a composition percentage satisfying the following requirements: k+l+m+n=100, 25≦k≦55, 5≦l≦30, 15≦m≦35 and 5≦n≦30,
   said dielectric material having a relative dielectric constant of 30 or higher.

2. The dielectric material according to claim 1, which has a relative dielectric constant of 40 or higher.

3. The dielectric material according to claim 1, wherein the material has a first unloaded Q value in a case that the material contains 40 parts by mass of the glass per 100 parts by mass of the composition, the material has a second unloaded Q value in a case that the material contains 20 parts by mass of the glass per 100 parts by mass of the composition, and a lowering ratio of a product of the first unloaded Q value and a resonance frequency at a measurement point of the first unloaded Q value to a product of the second unloaded Q value and a resonance frequency at a measurement point of the second unloaded Q value is 25% or less.

4. The dielectric material according to claim 1, which further comprises at least one of Al and Mn and a content of Al in terms of $Al_2O_3$ is 1.5 parts by mass or less per 100 parts by mass of the composition and a content of Mn in terms of MnO is 3.0 parts by mass or less per 100 parts by mass of the composition.

5. An LC filter comprising the dielectric material according to claim 1.

6. A method for producing a dielectric material comprising:

mixing a composition represented by $aBaO.bTiO_2.cREO_{3/2}.dBiO_{3/2}$, wherein a, b, c and d each independently represent a molar ratio satisfying the following requirements: $a+b+c+d=1$, $0.09 \leq a \leq 0.16$, $0.54 \leq b \leq 0.62$, $0.20 \leq c \leq 0.34$ and $\leq 0.10$, and RE represents a rare earth metal, and from 5 to 40 parts by mass, per 100 parts by mass of the composition represented by $aBaO.bTiO_2.cREO_{3/2}.dBiO_{3/2}$, of a glass containing a component represented by $kBaO.lZnO.mB_2O_3.nSiO_2$, wherein k, l, m and n each independently represent a composition percentage satisfying the following requirements: $k+l+m+n=100$, $25 \leq k \leq 55$, $5 \leq l \leq 30$, $15 \leq m \leq 35$ and $5 \leq n \leq 30$; and sintering the mixture at 850 to 1050° C., said dielectric material having a relative dielectric constant of 30 or higher.

7. The method according to claim 6, wherein at least one of an Al component and an Mn component is added so as to give an Al content in terms of $Al_2O_3$ of 1.5 parts by mass or less per 100 parts by mass of the composition and an Mn content in terms of MnO of 3.0 parts by mass or less per 100 parts by mass of the composition.

8. The method according to claim 6, wherein a relative dielectric constant and a temperature coefficient of a resonance frequency are controlled depending on a content of the glass.

9. The dielectric material according to claim 1, which contains the composition represented by $aBaO.bTiO_2.cREO_{3/2}.dBiO_{3/2}$ in an amount of from 71.4 to 95.2 wt % of the dielectric material.

10. The method according to claim 6, wherein the dielectric material contains the composition represented by $aBaO.bTiO_2.cREO_{3/2}.dBiO_{3/2}$ in an amount of from 71.4 to 95.2 wt %.

* * * * *